United States Patent
Giove

(10) Patent No.: US 11,492,872 B2
(45) Date of Patent: Nov. 8, 2022

(54) LOW SHEAR CONTROL VALVE

(71) Applicant: Control Components, Inc., Rancho Santa Margarita, CA (US)

(72) Inventor: Fabio Giove, Gioia del Colle (IT)

(73) Assignee: CONTROL COMPONENTS, INC., Rancho Santa Margarita, CA (US)

(*) Notice: Subject to any disclaimer, the term of this patent is extended or adjusted under 35 U.S.C. 154(b) by 534 days.

(21) Appl. No.: 16/582,174

(22) Filed: Sep. 25, 2019

(65) Prior Publication Data

US 2021/0087906 A1 Mar. 25, 2021

(51) Int. Cl.
| | |
|---|---|
| *F16K 47/08* | (2006.01) |
| *F16K 47/06* | (2006.01) |
| *F16K 3/24* | (2006.01) |
| *F16K 3/34* | (2006.01) |
| *E21B 34/08* | (2006.01) |
| *F16K 27/00* | (2006.01) |
| *E21B 4/00* | (2006.01) |
| *F16K 15/08* | (2006.01) |

(Continued)

(52) U.S. Cl.
CPC .............. *E21B 34/08* (2013.01); *E21B 4/003* (2013.01); *F16K 5/08* (2013.01); *F16K 15/023* (2013.01); *F16K 15/08* (2013.01); *F16K 27/003* (2013.01); *E21B 2200/06* (2020.05)

(58) Field of Classification Search
CPC .... F16K 47/04; F16K 47/06; F16K 47/08–16; F16K 3/267; F16K 3/246; F16K 3/32; F16K 3/36; F16K 1/52; F16K 1/54; Y10T 137/86791; Y10T 137/86734; Y10T 137/87265; Y10T 137/86759

See application file for complete search history.

(56) References Cited

U.S. PATENT DOCUMENTS

| | | |
|---|---|---|
| 315,640 A | 4/1885 | Keambe |
| 3,529,628 A | 9/1970 | Cummins |

(Continued)

FOREIGN PATENT DOCUMENTS

| | | | |
|---|---|---|---|
| DE | 2514879 A1 | * 10/1976 | |
| DE | 102016102756 B4 | * 5/2018 | ............... F16K 3/34 |

(Continued)

OTHER PUBLICATIONS

International Search Report for PCT/US2020/052008; dated Dec. 14, 2020.

*Primary Examiner* — Marina A Tietjen
(74) *Attorney, Agent, or Firm* — Stetina Brunda Garred and Brucker; Mark B. Garred

(57) ABSTRACT

A flow control device includes a stack of annular discs positioned in a flow path. Each disc includes fluid passageways extending between inner and outer perimeters of the disc, with each passageway defining a flow axis extending out of the disc and radially offset from a central axis of the discs. A plug is moveable relative to the discs between closed and open positions. In the closed position, a cylindrical section of the plug is positioned to block fluid flow through the annular discs. In the open position, the annular discs and a tapered section of the plug collectively define an annular vortex chamber. The fluid passageways in the annular discs and the tapered section of the plug collectively impart a rotational flow when the plug is in the open position and as fluid exits the annular discs.

20 Claims, 6 Drawing Sheets

(51) Int. Cl.
  *F16K 5/08* (2006.01)
  *F16K 15/02* (2006.01)

(56) References Cited

U.S. PATENT DOCUMENTS

| | | | | |
|---|---|---|---|---|
| 3,648,718 | A | * | 3/1972 | Curran ................ F16K 47/02 251/210 |
| 3,894,716 | A | * | 7/1975 | Barb ................ F16K 47/02 137/625.37 |
| 3,990,475 | A | * | 11/1976 | Myers ................ F16K 47/04 137/625.3 |
| 4,249,574 | A | * | 2/1981 | Schnall ................ F16K 47/08 137/625.37 |
| 4,407,327 | A | * | 10/1983 | Hanson ................ F16K 47/12 251/126 |
| RE32,197 | E | * | 7/1986 | Self ................ F16L 55/02781 137/625.3 |
| 5,964,248 | A | * | 10/1999 | Enarson ................ F16K 47/04 137/625.37 |
| 6,782,920 | B2 | | 8/2004 | Steinke |
| 7,625,416 | B2 | | 12/2009 | Nilsen et al. |
| 8,617,405 | B2 | | 12/2013 | Hopper |
| 8,622,075 | B2 | | 1/2014 | Husveg |
| 9,650,862 | B2 | * | 5/2017 | Husveg ................ F16K 3/316 |
| 2003/0034074 | A1 | * | 2/2003 | McCarty ................ F16K 47/04 137/625.3 |
| 2003/0188787 | A1 | | 10/2003 | Steinke |
| 2003/0192601 | A1 | * | 10/2003 | Baumann ................ F16K 47/08 137/625.3 |
| 2004/0183044 | A1 | | 9/2004 | Wears |
| 2007/0095032 | A1 | | 5/2007 | Nilsen et al. |
| 2010/0064893 | A1 | | 3/2010 | Hopper |
| 2010/0300542 | A1 | * | 12/2010 | Haines ................ F16K 47/08 137/1 |
| 2015/0129786 | A1 | * | 5/2015 | Cazcarra Pallaruelo ............. F16K 3/246 251/127 |
| 2015/0152976 | A1 | | 6/2015 | Fagerlund et al. |
| 2017/0268697 | A1 | * | 9/2017 | McCormick ................ F16K 3/34 |
| 2017/0370500 | A1 | | 12/2017 | Haines et al. |

FOREIGN PATENT DOCUMENTS

| | | | | |
|---|---|---|---|---|
| EP | 2042685 A1 | * | 4/2009 | ............. E21B 34/02 |
| WO | WO-0184029 A1 | * | 11/2001 | ............. F16K 47/08 |
| WO | WO-2006070020 A1 | * | 7/2006 | ........ B01D 17/0217 |
| WO | WO-2011014059 A1 | * | 2/2011 | ............. F16K 47/08 |
| WO | WO-2012165677 A1 | * | 12/2012 | ............. F16K 3/246 |

* cited by examiner

LOW SHEAR CONTROL VALVE

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present disclosure relates generally to flow control devices, and more specifically to a flow control device capable of separating portions of a medium and controlling the introduction flow velocity of the medium into a separator.

2. Description of the Related Art

When handling fluids flowing under pressure, flow control valves and fluid separators may be used to achieve desired flow qualities and characteristics. The control of kinetic energy and flow speed within a flow control valve may be critical for minimizing the possibility of erosion and vibrations to reduce premature failure of the control component. Furthermore, excessive speed and turbulence in the fluid may result in many undesirable consequences, including uncontrolled water droplet fractionation and the formation of foam and emulsion, which may very likely occur in flows with mixtures of gas and liquids. These flow phases, when agitated by valve trim outlet speed, can enhance the formation of unwanted foam and emulsion, which may be responsible for undesired impurities in separated fluids. The formation of foam and emulsion may also create difficulties in detecting fluid levels inside separators.

The main drivers of downstream performance of separators may be its inlet and upstream conditions. Unfortunately, the design and selection of separators may be made on predefined, simple rules that do not take into account real inlet conditions, such as fluid composition, flow regime, percent of foam/emulsion at the inlet, densities of different fluids, size of bubbles of dispersed phases, etc. Moreover, upstream flow conditions may also be downgraded by the attempt to control the flow by valves positioned at a certain distance before the inlet of the separator. Such valves may create a disturbance at the entrance of such device, that may dramatically reduce the efficiency of the entire process by further fractionating the dispersed phases and generating more foam and emulsions. Rather, the design and selection may be predicated solely on inlet speed or Separator "Inlet Momentum" as may be defined by classic literature on the subject. Even if inlet speed or momentum may be an acceptable design parameter at the initial stage of well development, although still based on empiric rules which may not be universally valid, over time, the proportions of gas in the fluid may change, which may cause the separator work incorrectly or inefficiently. As such, many separators may require an upgrade to the inlet, with the upgrade typically including a cyclonic inlet, to adjust to the new conditions.

While such an upgrade may result in better performance of the separator under specific inlet conditions, some may be reluctant to incorporate the upgraded inlet because it may not be workable in a wide range of conditions. In other words, cyclonic inlets are normally known to be efficient at very high flow rates and disruptive, when these work at low speeds, where the fluid may be destroyed by high shear levels. For this reason, the installation of the inlet may result in decayed performance, rather than appreciable improvements, if the cyclonic inlet has not been correctly sized for the real operating conditions, which also might change over time.

Accordingly, there is a need in the art for a flow control device having a variable vortex chamber, with the flow control device being capable of adapting to various fluid flow speeds, but potentially keeping a defined speed at the cyclonic throat, on a variable range of conditions. This control device may be placed directly at the inlet of the separator and may replace the use of conventional flow control valves which generate high shear levels. The control device may also be able to provide the same performance of a cyclone in a wide range of flow control. Various aspects of the present disclosure address this particular need, as will be discussed in more detail below.

BRIEF SUMMARY

In accordance with one embodiment of the present disclosure, there is provided a flow control device comprising a valve body having an inlet, an outlet, and a flow path extending between the inlet and the outlet. A stack of annular discs is positioned in the flow path of the valve body and is disposed about a central axis. Each disc includes an inner perimeter, an outer perimeter, and a plurality of fluid passageways extending between the inner perimeter and the outer perimeter. Each fluid passageway includes an inlet at the outer perimeter, an outlet at the inner perimeter, and defines a flow axis extending out of the disc from the inner perimeter that is radially offset from the central axis. The flow control device further includes a plug having a cylindrical section and a tapered section extending from the cylindrical section, with the plug being moveable along the central axis between a closed position and an open position. In the closed position, the cylindrical section is disposed adjacent the inner perimeters of the stack of annular discs to block fluid flow through the stack of annular discs. In the open position, the cylindrical section is spaced axially from the stack of annular discs such that the inner perimeters of the stack of annular discs and the tapered section of the plug collectively define an annular vortex chamber. The fluid passageways in the stack of annular discs and the tapered section of the plug collectively impart a rotational fluid flow around the central axis when the plug is in the open position and as fluid exits the stack of annular discs and flows through the vortex chamber toward the outlet.

Each fluid passageway in a given disc may be a curved passageway. Each inlet may be larger than the outlet of the corresponding fluid passageway. Each disc may include three fluid passageways formed therein. The outlets of the plurality of fluid passageways in a given disc may be spaced 120 degrees from each other, or differently, according to the calculated speed necessary to control the flow with a certain valve characteristic. The number of flow passageways may be varied over the stroke, which may allow for adjustment of the valve to the different operating conditions.

Each fluid passageway in a given disc may be a linear passageway. The inlet of each fluid passageway may be same size as outlet. Each disc may include four fluid passageways formed therein. The outlets of the plurality of fluid passageways in a given disc may be spaced 90 degrees from each other.

The tapered section of the plug may extend from the cylindrical section and terminate at a distal end. The tapered section may define a diameter that decreases from the cylindrical section to the distal end. In a longitudinal cross section of the plug taken parallel to and including the central axis, the tapered section includes opposed convex sides. The tapered section may optionally include a helical groove formed in an outer surface thereof. The tapered section may also include a set of helical grooves to enhance formation of the vortex.

According to another embodiment, the flow control device includes a valve body having an inlet, an outlet, and a flow path extending between the inlet and the outlet. A stack of annular discs is positioned in the flow path of the valve body and disposed about a central axis. Each disc includes an inner perimeter, an outer perimeter, and a plurality of fluid passageways extending between the inner perimeter and the outer perimeter. Each fluid passageway includes an inlet at the outer perimeter, an outlet at the inner perimeter, and defines a flow axis extending out of the disc from the inner perimeter that is radially offset from the central axis. The flow control device further includes a plug having a cylindrical section and a tapered section extending from the cylindrical section. The plug is moveable along the central axis between a closed position, a low flow position, and a high flow position. In the closed position, the cylindrical section is disposed adjacent the inner perimeters of the stack of annular discs to block fluid flow through the stack of annular discs. In the low flow position and the high flow position, the stack of annular discs and the tapered section of the plug collectively define an annular vortex chamber, with the volume of the annular vortex chamber increasing as the plug is moved from the low flow position to the high flow position. The fluid passageways in the stack of annular discs and the tapered section of the plug collectively impart a rotational fluid flow around the central axis when the plug is in the low flow position and the high flow position, and as fluid exits the stack of annular discs and flows through the vortex chamber toward the outlet.

The present disclosure will be best understood by reference to the following detailed description when read in conjunction with the accompanying drawings.

BRIEF DESCRIPTION OF THE DRAWINGS

These and other features and advantages of the various embodiments disclosed herein will be better understood with respect to the following description and drawings, in which.

Common reference numerals are used throughout the drawings and the detailed description to indicate the same elements.

DETAILED DESCRIPTION

Figure 1:
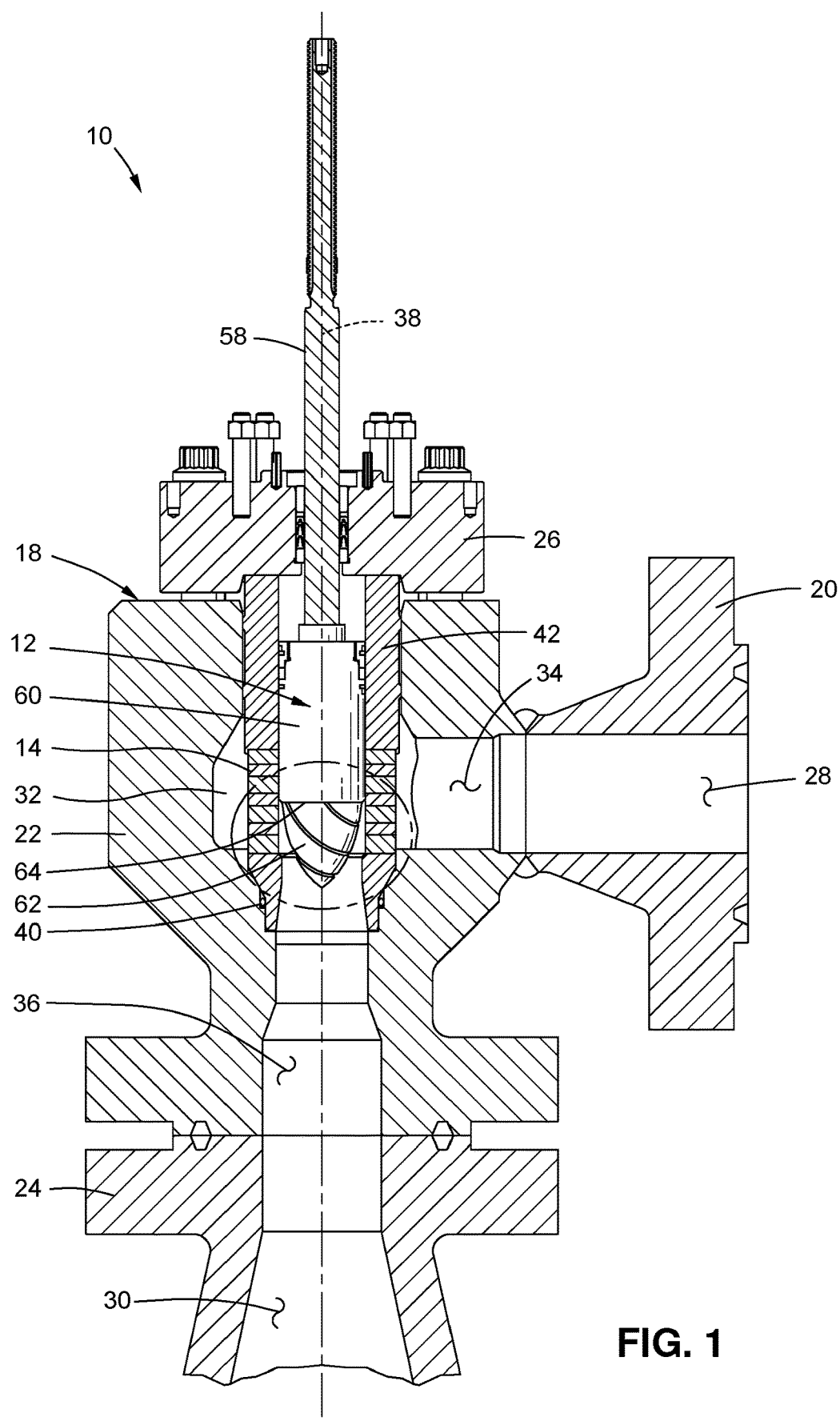
FIG. 1 is a partial cross-sectional view of a flow control device including a stack of annular discs and a plug having a tapered section, which collectively induce a rotational fluid flow, the plug being in a partial open position.

Referring now to the drawings, wherein the showings are for purposes of illustrating a preferred embodiment of the present disclosure, and are not for purposes of limiting the same, there is depicted a flow control device 10 capable of providing low shear control of a fluid flowing through the flow control device 10. In this regard, the flow control device 10 may be operative to subject a fluid flowing therethrough, such as a gas-oil-water mixture, to variable and controllable g-forces for handling or separating foam and emulsions from the remainder of the mixture. The flow control device 10 may generate vorticity along a flow passageway and maintain the vorticity by increasing flow speed at a partial stroke of a plug 12. The vorticity may be created by a stack of annular discs 14 and the plug 12, which is selectively positionable within a central bore collectively defined by the discs 14. The discs 14 may each include a plurality of passageways which create a rotational fluid flow in the fluid as the fluid passes through the discs 14. Furthermore, the configuration of the discs 14 and the plug 12 may collectively create a vortex chamber 16, the shape of which may foster continued rotational flow of the fluid after it exits the discs 14.

Referring now specifically to FIG. 1, the flow control device 10 includes a valve body 18 including an inlet arm 20, a main housing 22, an outlet arm 24, and a valve cap 26. The inlet arm 20 includes a fluid inlet 28 and the outlet arm 24 includes a fluid outlet 30. A flow path extends through the main housing 22 between the fluid inlet 28 and the fluid outlet 30. The main housing 22 includes a main gallery 32 positioned between a gallery inlet 34 and a gallery outlet 36, with the gallery inlet 34 being in fluid communication with the inlet arm 20, and the gallery outlet 36 being in fluid communication with the outlet arm 24. The valve cap 26 may be coupled to the main housing 22 opposite the outlet arm 24 to substantially enclose the main gallery 32.

The annular discs 14 may be arranged in a stack and define a central axis 38. The discs 14 may be positioned within the gallery 32 and reside between an annular lower spacer 40 and an annular upper spacer 42. The lower spacer 40 may rest on a shoulder formed on the main housing 22 adjacent the gallery outlet 36 and may define a valve seat 44. The upper spacer 42 may extend between the discs 14 and the valve cap 26, such that the upper spacer 42, the discs 14, and the lower spacer 40 may be tightly secured between the valve cap 26 and the main housing 22.

Figure 2:
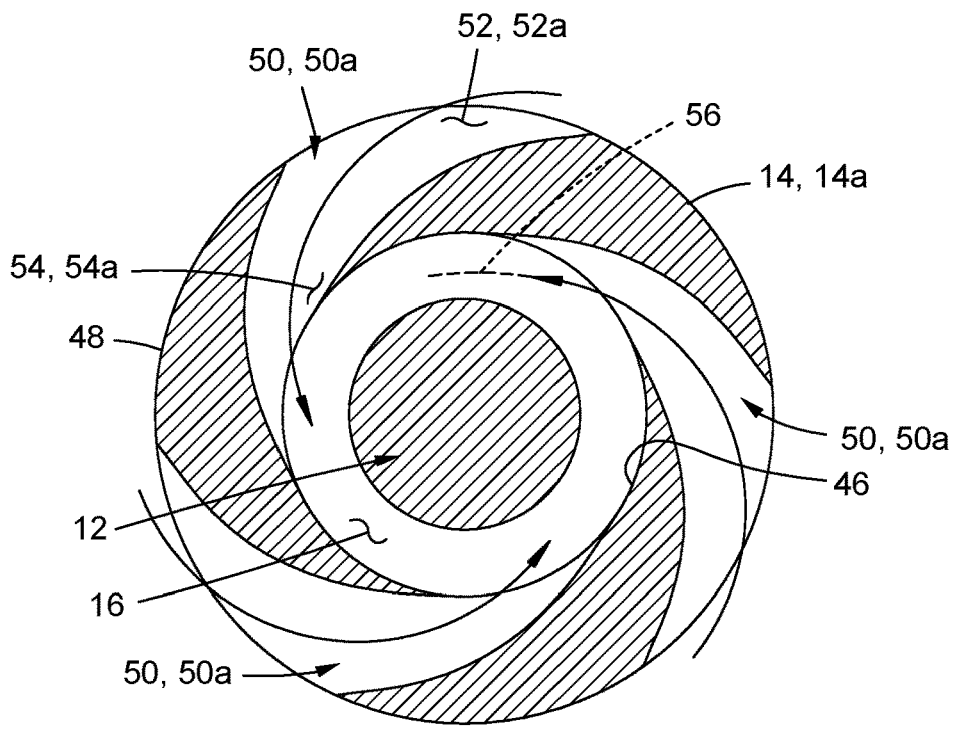
FIG. 2 is a top cross-sectional view of an exemplary disc of the stack and the corresponding plug in the partial open position, with the disc defining a plurality of curved flow passageways and the central tapered section of the plug defining an area ratio for speed control in the inner section of flow path, at least up to the venturi seat area of the valve.
Figure 3:
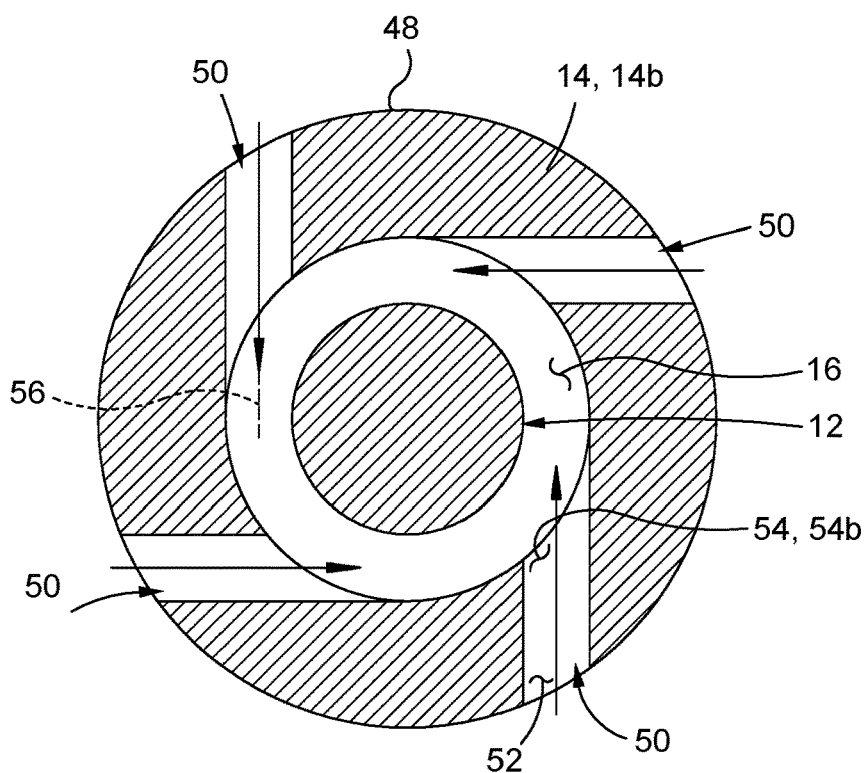
FIG. 3 is a top cross-sectional view of an alternative exemplary disc of the stack or a conventional cage trim with holes drilled tangentially to the cylindrical areas and the corresponding plug in the partial open position, with the disc or cage defining a plurality of linear flow passageways and the central tapered section of the plug defining an area ratio for speed control in the inner section of flow path, at least up to the venturi seat area of the valve.

Referring now to FIGS. 2 and 3, different examples of discs 14a, 14b are shown, the primary distinctions relating to the number and configuration of passageways formed therein, which will be described in more detail below. More generally, each disc 14 may include an inner peripheral surface or perimeter 46 and an outer peripheral surface or perimeter 48. It is contemplated that the inner and outer diameter dimensions of the various discs 14 in the stacked arrangement will be such that inner perimeters 46 are substantially flush with each other, as are the outer perimeters 48. A plurality of fluid passageways 50 may be formed in each disc 14 and extend between the inner perimeter 46 and the outer perimeter 48 of the respective disc 14. Each fluid passageway 50 includes a disc inlet 52 at the outer perimeter 48 and a disc outlet 54 at the inner perimeter 46, and thus, the stack of discs 14 may be configured for an inward flow, e.g., flow through the discs 14 in a radially inward direction toward the central axis 38. Each passageway 50 may define a flow axis 56 extending out of the disc 14 from the inner perimeter 46 that is radially offset from the central axis 38. In this regard, the flow axis 56 may be defined as the continuation or extension of the midline of the corresponding disc passageway 50. As will be described in more detail below, the disc passageways 50 may be curved or linear and may also have a streamlined inlet radius, to mitigate or avoid formation of vortexes and high shear levels into the fluids. In the case of a curved passageway, the flow axis 56 may include the degree of curvature defined by the passageway 50. Since the flow axis 56 is radially offset from the central axis 38, the flow axis 56 does not intersect with the central axis 38. Rather, each flow axis 56 is associated with a flow vector (e.g., flow direction and flow magnitude), which results in rotational flow around the central axis 38. The flow axes 56 associated with the flow passageways 50 in a given disc 14 are arranged to complement each other to maintain the rotational flow, rather than work against each other to stop rotation or create turbulence.

Referring now specifically to FIG. 2, disc 14a is shown with a plurality of curved passageways 50a formed in the disc 14a. In the exemplary disc 14a, three fluid passageways 50a are formed, although it is understood that the disc 14a may include as little as one passageway 50a, or greater than two passageways 50a, such as four, five, six, etc. Preferably, the passageways 50a are evenly spaced from each other to provide a balanced rotational flow as the fluid exits the discs 14a at the disc outlets 54a. Thus, in the case of three passageways 50a, the spacing may be approximately 120 degrees from the centerline of each passageway 50a.

In one embodiment, the passageways 50a vary in size from the inlet 52a to the outlet 54a. In the disc 14a shown in FIG. 2, the size of the inlet 52a is larger than the size of the outlet 54a. Thus, the formation of losses and eddies may be minimized at the inlet of the channels, due to reduced speed. As the fluid flows through the passageway 50a from the inlet 52a to the outlet 54a, the volume of the passageway 50a may decrease, which may have the effect of increasing the velocity of the fluid.

Referring now specifically to FIG. 3, disc 14b is shown with a plurality of linear passageways 50b. In the exemplary disc 14b, four fluid passageways 50b are formed, although it is understood that the disc 14b may include as little as one passageway 50b, or greater than four passageways 50b, such as five, six, etc., passageways 50b. Preferably, the passageways 50b are evenly spaced from each other to provide a balanced rotational flow as the fluid exits the discs 14b at the disc outlets 54b. Thus, in the case of four passageways 50b, the spacing may be approximately 90 degrees from the centerline of each passageway 50b to that of an adjacent passageway 50b.

Figure 4:
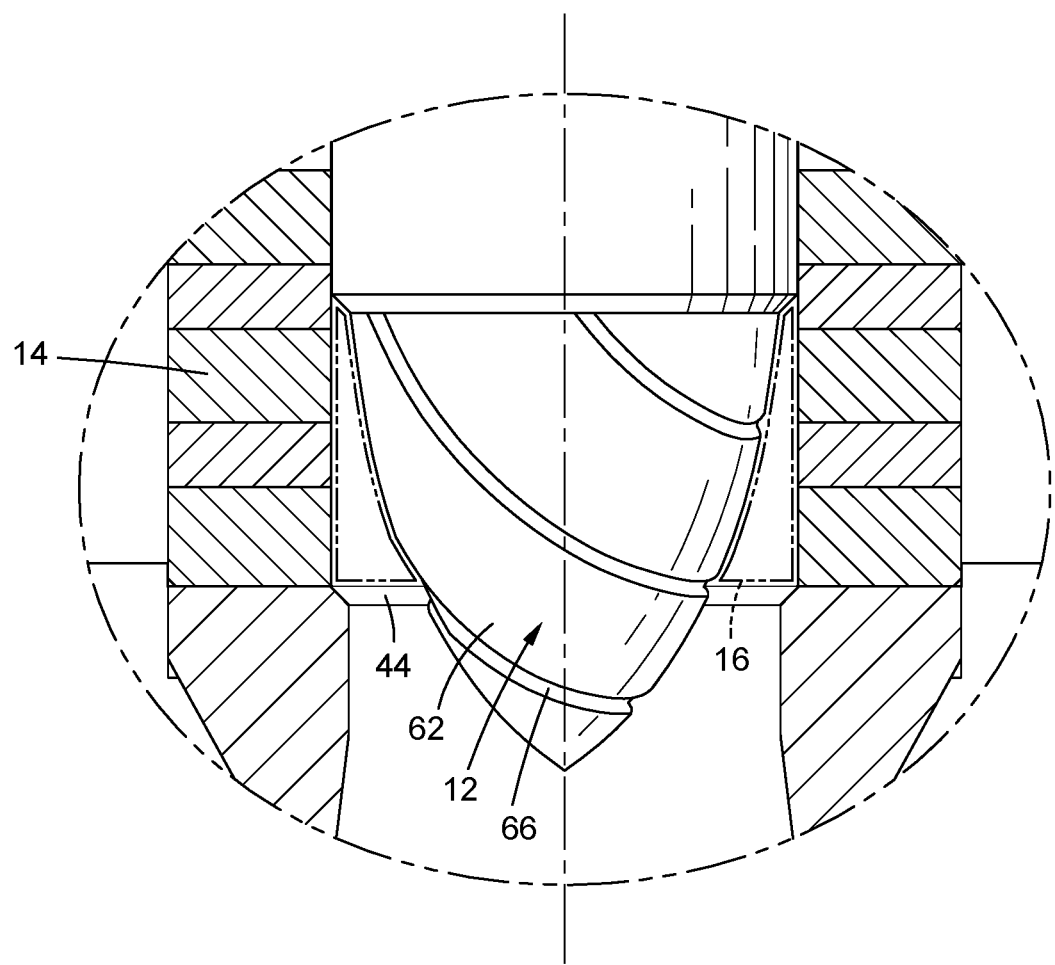
FIG. 4 is an enlarged view of the plug and discs of FIG. 1, the tapered section of the plug being spaced from the discs to form a vortex chamber.

The passageways 50b shown in FIG. 4 have a substantially constant size from the inlet 52b to the outlet 54b. Thus, the volume of the fluid entering the passageway 50b may be equal to the volume of fluid exiting the passageway 50b.

Although FIG. 2 shows curved passageways 50a that vary in size, and FIG. 3 shows linear passageways 50b that are constant in size, it is contemplated that in other embodiments, discs 14 may include curved passageways 50 that are constant in size, and linear passageways 50 that vary in size.

The flow control device 10 further includes a plug 12 coupled to a stem 58, with the plug 12 being moveable along the central axis 38 between closed and open positions to control fluid flow through the discs 14. The plug 12 includes a cylindrical section 60 coupled to the valve stem 58, and a conical or tapered section 62 extending from the cylindrical section 60. The cylindrical section 60 includes an outer perimeter, the outer diameter of which is substantially equal to, but slightly smaller than the diameters of the inner perimeters 46 of the discs 14. In this regard, the sizing of the cylindrical section 60 is such that the cylindrical section 60 is moveable through the central bore of the stack of discs 14, while also being able to block fluid flow through the discs 14 (i.e., effectively block the outlets 54) when the cylindrical section 60 is positioned in the central bore collectively defined by the stacked discs 14. The cylindrical section 60 defines an annular plug edge 64 that selectively engages or interfaces with the valve seat 44 when the plug 12 is in the closed position to block flow through the gallery 32. The cylindrical section 60 includes an outer surface having a length extending from the plug edge 64 that allows the cylindrical section 60 to cover all of the discs 14 and thus effectively block all of the outlets 54 in the stack when the plug 12 is in the closed position.

The tapered section 62 of the plug 12 may extend from cylindrical section 60 and terminate at a distal end. An enlargement of the tapered section 62 is shown in FIG. 4. The tapered section 62 may define a diameter that decreases from cylindrical section 60 to the distal end. In other words, the maximum diameter of the tapered section 62 may be adjacent the cylindrical section 60, and the minimum diameter of the tapered section 62 may be adjacent or at the distal end. In one embodiment, the variance in the diameter of the tapered section 62 may be linear or non-linear which, in any event, results in the tapered section 62 having a generally conical exterior profile or, more particularly, the general exterior profile of an elliptical nose cone. In other words, in a longitudinal cross section of the plug 12 including the central axis 38, the tapered section 62 includes opposed convex sides. The curved configuration of the tapered section 62 partially defines a curved vortex chamber 16 within the central bore of the discs 14, which further promotes rotational flow of the fluid, as will be described in more detail below. The tapered section 62 may also provide a variable area venturi, which is uncommon in the majority of conventional configurations. In particular, the tapered section 62 may be capable of generating a variable restriction in the vortex chamber 16, in accordance with the stroke of moveable plug 12.

Figure 5:
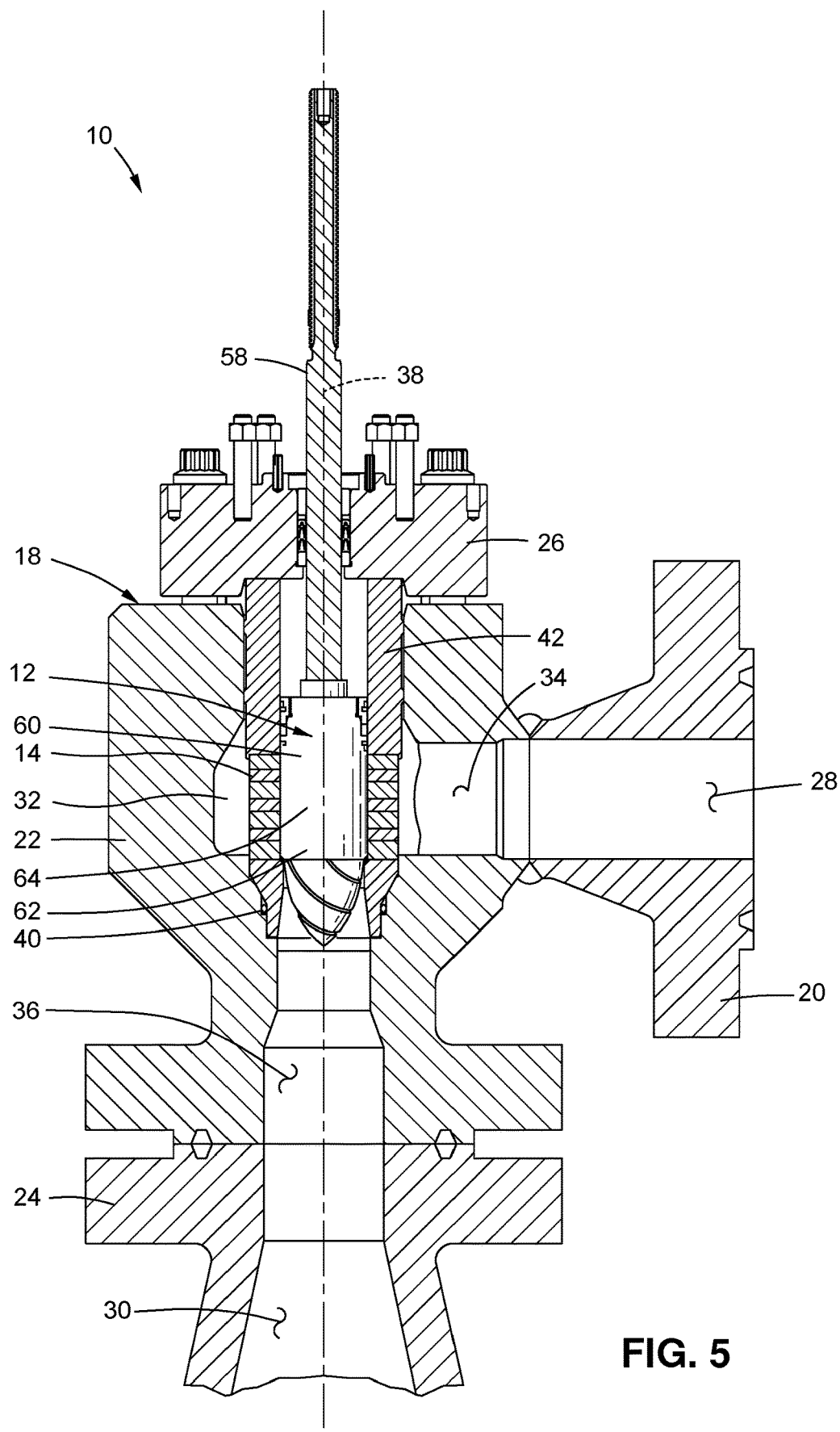
FIG. 5 is a partial cross-sectional view of the flow control device, with the plug being in a closed position.

In one embodiment, and as shown in FIGS. 1, 4 and 5, the outer surface of the tapered section 62 may include a continuous groove 66 formed therein. The groove 66 may extend both axially and circumferentially around the outer surface of the tapered section 62 to define a helical configuration. The groove 66 may be oriented in the direction of the swirling flow to accelerate the formation of gas by localized flashing or simply by centrifugal acceleration of the swirl, which tends to direct to the center the gas and to the exterior, the heavier portion of the flow. However, those of ordinary skill in the art will recognize that the groove 66 is optional and may be omitted from the outer surface of the tapered section 62 without departing from the spirit and scope of the present disclosure. Along these lines, it is further contemplated that the continuous groove 66 could be substituted with a series of separate grooves, one or more fins, or other structures disposed within or protruding from the outer surface of the tapered section 62, any of which are intended to enhance the performance effects facilitated by the architecture of the passageways 50 of the discs 14 within the stack working in concert with the exterior profile of the plug 12.

Figure 6:
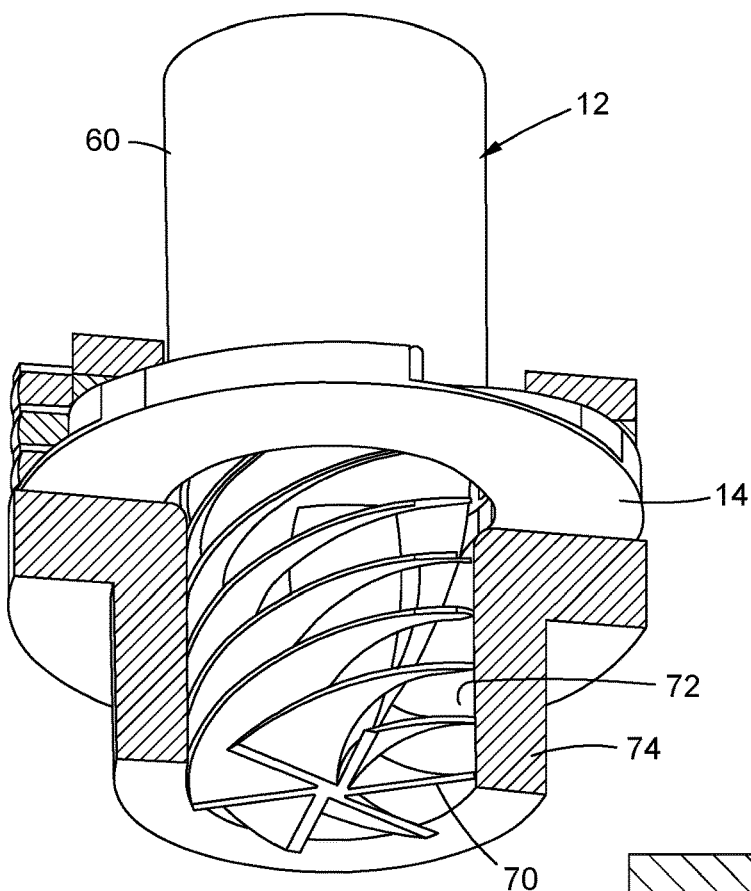
FIG. 6 is a lower perspective, partial cross-sectional view of an embodiment of the flow control device including a plurality of helicoidal fins extending from a tapered section of the plug.
Figure 7:
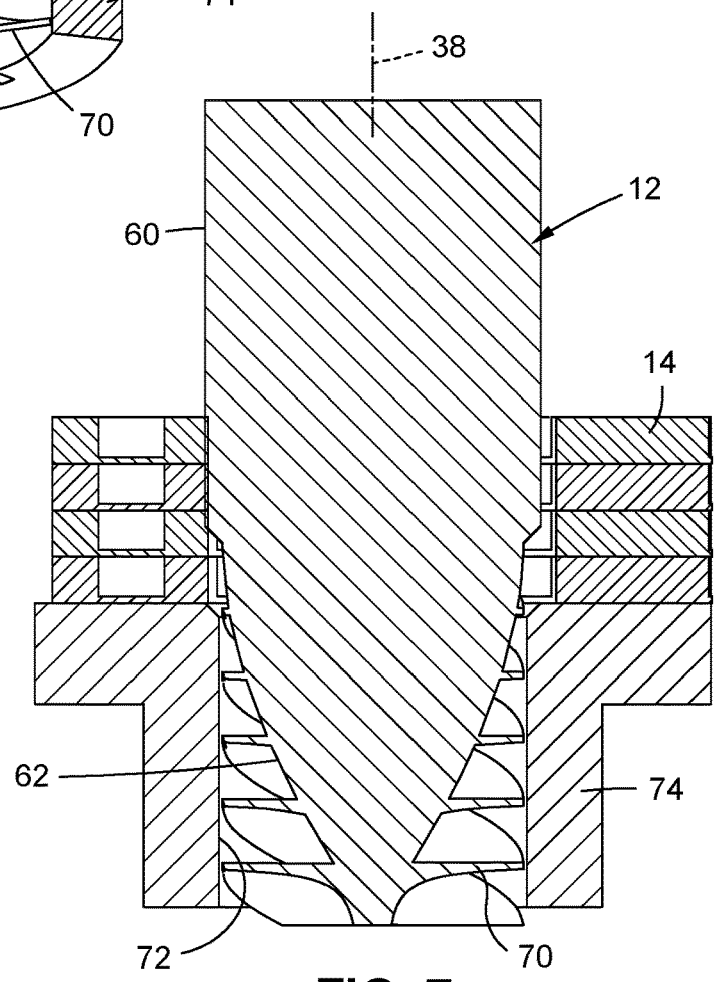
FIG. 7 is a front cross-sectional view of the flow control device depicted in FIG. 6.

An alternative embodiment is depicted in FIGS. 6 and 7, with the plug 12 including a plurality of helicoidal fins 70 extending outwardly from the tapered section 62 of the plug 12 to promote the vortex consistently with the shape of the outlets 54. In this regard, the helicoidal fins 70 may define several passageways around the tapered section 62 that are helical in shape (e.g., a vortex), such that the vortex may not only be defined by the momentum of the fluid, but also by the structural configuration of the passageways. The helicoidal fins 70 may extend radially outward by a distance which substantially occupies the radial distance between the tapered section 62 and the inner surface 72 of a lower valve body 74. Thus, due to the tapered configuration of the tapered section 62, from the perspective shown in FIG. 7, the radial extension of the upper portion of the fins 70 may be smaller than the radial extension of the lower portion of the fins 70, due to the due to the size of the radial distance between the tapered section 62 and the inner surface 72 of the lower valve body 74 increasing from the top to the bottom. Each of the helicoidal fins 70 may also extend in an axial direction parallel to the central axis 38 along the length of the tapered section 62, e.g., from the cylindrical section 60 to the distal end of the tapered section 62.

The plug 12 is moveable relative to the discs 14 along the central axis 38 between a closed position and various open positions associated with different flows (e.g., low flow or high flow). In the closed position, the cylindrical section 60 is disposed adjacent the inner perimeters 46 of the stack of annular discs 14 to block fluid flow through the stack of annular discs 14. In the open position, the cylindrical section 60 is spaced axially from the stack of annular discs 14 such that the inner perimeters 46 of the stack of annular discs 14 and the tapered section 62 of the plug 12 collectively define the annular vortex chamber 16. The volume of the annular vortex chamber 16 increases as the plug 12 is moved from a position associated with low flow to a position associated with high flow. The fluid passageways 50 in the stack of annular discs 14 and the tapered section 62 of the plug 12 collectively impart a rotational fluid flow around the central axis 38 when the plug 12 is in the open position and as fluid exits the stack of annular discs 14 via the outlets 54 and flows through the vortex chamber 16 toward the gallery outlet 36.

In use, when the plug 12 is in the closed position, as shown in FIG. 5, the plug edge 64 is in contact with the valve seat 44 and the cylindrical section 60 of the plug 12 is aligned with the discs 14 to cover and thus block the outlets 54 of the discs 14. Due to the complementary sizing between the inner perimeter 46 of the discs 14 and the outer diameter of the cylindrical section 60 of the plug 12, there is effectively no space between the stack of discs 14 and the plug 12 when the plug 12 is in the closed position. Accordingly, fluid is prevented from flowing through the discs 14, and in particular the passageways 50 thereof.

As the plug 12 is moved from the closed position toward the open position, the plug edge 64 is moved from the valve seat 44 to create space between the plug 12, as can be seen in FIG. 4. Movement of the plug 12 from the closed position moves the upper end portion of tapered section 62 into alignment with the lowest disc 14 in the stack. Due to the decreased diameter of the tapered section 62 relative to the cylindrical section 60, an annular gap (i.e., the vortex chamber 16) is formed between the tapered section 62 and the lowest disc. The creation of the vortex chamber 16 allows fluid to flow through the passageways 50 in the lowest disc. In particular, as fluid flows through the passageways 50, the fluid exits the passageways 50 along respective flow axes 56 offset from the central axis 38, which results in rotational flow of the fluid as the fluid from the various passageways 50 join in the vortex chamber 16. Furthermore, the annular shape of the vortex chamber 16 urges the fluid to continue flowing in the rotational direction. The controlled vortex inside the flow control device 10 helps separation of the fluid by coalescing small liquid droplets and by collapsing the gas bubbles which form foams and emulsions.

The fluid may continue flowing in the rotational direction as it flows toward the outlet. In this regard, the remaining portion of the tapered section 62 may occupy a portion of the flow path toward the gallery outlet 36, thereby hindering the fluid flow from immediately transitioning to a purely axial flow. Furthermore, as the fluid flows over the tapered section 62, and perhaps the groove 66 formed therein, gas may form along the surface of the groove 66 by localized flashing to separate the gas from the remaining portion of the fluid. Heavier portions of the fluids like sands or water, might be accumulated externally and therefore pre-separated, before the inlet into the main separator.

The plug 12 may continue to be moved from the valve seat 44 to uncover more discs 14 by aligning the tapered section 62 with a greater number of discs 14 in the stack. As the plug 12 moves in this manner, the volume of the vortex chamber 16 may increase to accommodate a larger fluid flow.

Desired flow characteristics may be achieved by selectively positioning the plug 12 to vary the size of the vortex chamber 16. In this regard, in low flow conditions, the size of the vortex chamber 16 may be smaller than in higher flow conditions. The variability allows the flow control device 10 to adapt to dynamic inlet conditions, such as changes in fluid composition, flow regime, percent of foam/emulsion at the inlet, densities of different fluids, etc.

Figure 8:
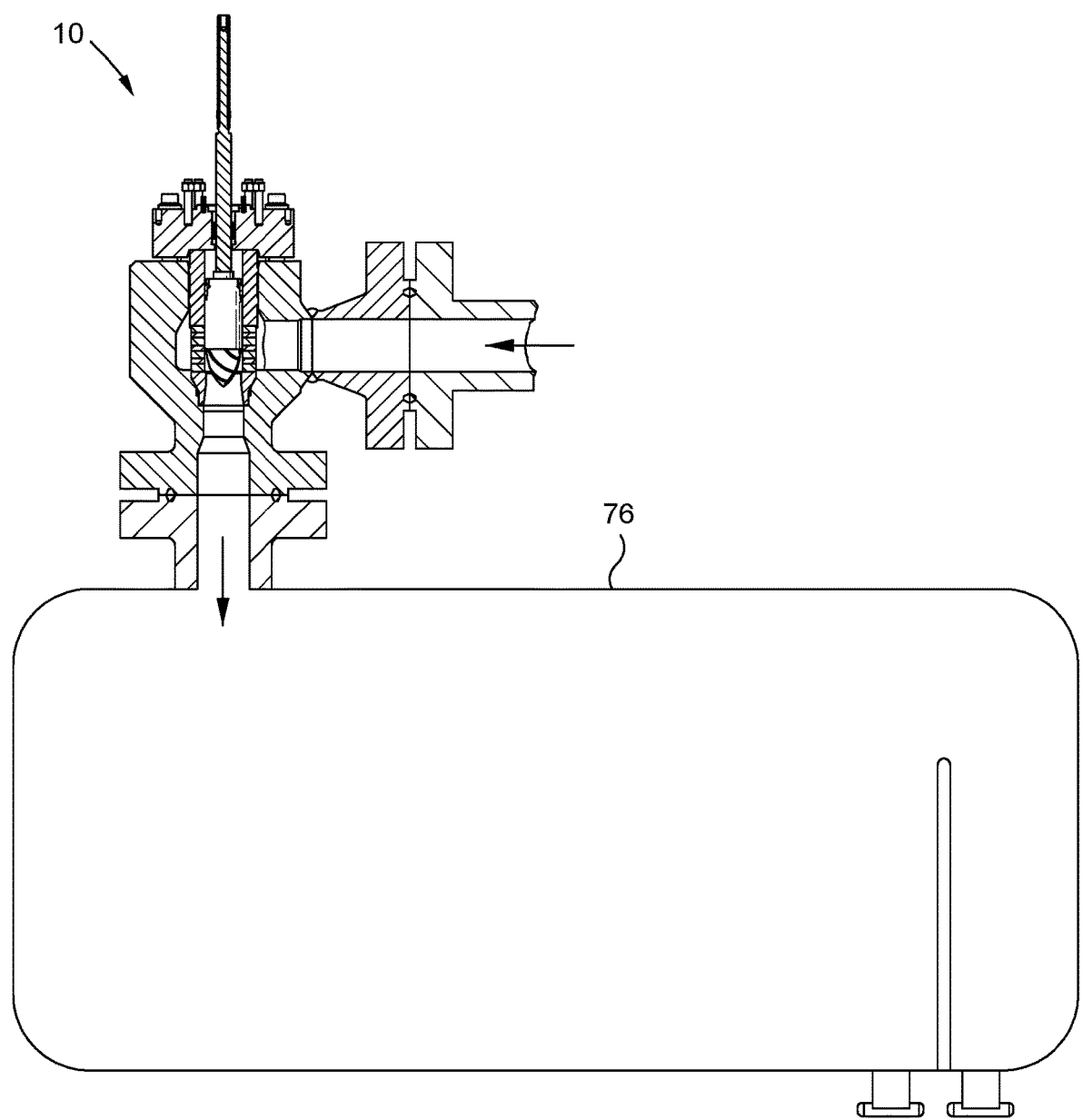
FIG. 8 is a partial cross-sectional schematic view of a flow control device incorporated as an inlet to a separator.

Referring now to FIG. 8, the flow control device 10, as described above may be used to control the flow at the inlet of a separator 76, which may receive a multiphase fluid and separate the fluid moving therethrough into respective portions. The flow control device 10 may also be partly associated with the separator 76 and work as an inlet device, in order to replace fixed area inlet devices or fix cyclonic inlets. In this implementation, the above-mentioned device 10 may act as a variable cyclonic inlet in order to accommodate the variability of the conditions of the field and the variability of the composition of the flow in time.

The particulars shown herein are by way of example only for purposes of illustrative discussion and are not presented in the cause of providing what is believed to be most useful and readily understood description of the principles and conceptual aspects of the various embodiments of the present disclosure. In this regard, no attempt is made to show any more detail than is necessary for a fundamental understanding of the different features of the various embodiments, the description taken with the drawings making apparent to those skilled in the art how these may be implemented in practice.

What is claimed is:

1. A flow control device comprising:
   a valve body having an inlet, an outlet and a flow path extending between the inlet and the outlet;
   a flow control element positioned in the flow path of the valve body and disposed about a central axis, the flow control element having an inner perimeter, an outer perimeter, and a plurality of fluid passageways extending between the inner perimeter and the outer perimeter, each fluid passageway having an inlet at the outer perimeter, an outlet at the inner perimeter, and defining a flow axis extending out of the flow control element from the inner perimeter that is radially offset from the central axis;
   a plug having a cylindrical section and a tapered section extending from the cylindrical section and terminating at a distal end, the tapered section having a diameter that decreases from the cylindrical section to the distal end and including a helical groove formed therein, the plug being moveable along the central axis between a closed position and an open position;
   in the closed position, the cylindrical section being disposed adjacent the inner perimeter of the flow control element to block fluid flow therethrough;
   in the open position, the cylindrical section being spaced axially from the flow control element such that the inner perimeter of the flow control element and the tapered section of the plug collectively define an annular vortex chamber;
   the fluid passageways in the flow control element and the tapered section of the plug collectively imparting a rotational fluid flow around the central axis when the plug is in the open position and as fluid exits the flow control element and flows through the vortex chamber toward the outlet.

2. The flow control device of claim 1, wherein each fluid passageway is a curved passageway.

3. The flow control device of claim 2, wherein the inlet of each fluid passageway is larger than the outlet of the corresponding fluid passageway.

4. The flow control device of claim 1, wherein each fluid passageway is a linear passageway.

5. The flow control device of claim 4, wherein the inlet of each fluid passageway is same size as the outlet.

6. The flow control device of claim 1, wherein the flow control element comprises a stack of annular discs, each disc having a plurality of the fluid passageways formed therein.

7. The flow control device of claim 6, wherein each disc includes three curved fluid passageways formed therein.

8. The flow control device of claim 7, wherein the outlets of the plurality of fluid passageways in a given disc are spaced 120 degrees from each other.

9. The flow control device of claim 6, wherein each disc includes four linear fluid passageways formed therein.

10. The flow control device of claim 9, wherein the outlets of the plurality of fluid passageways in a given disc are spaced 90 degrees from each other.

11. The flow control device of claim 1, wherein in a longitudinal cross section of the plug including the central axis, the tapered section includes opposed convex sides.

12. A flow control device comprising:
    a valve body having an inlet, an outlet and a flow path extending between the inlet and the outlet;
    a flow control element positioned in the flow path of the valve body and disposed about a central axis, the flow control element having an inner perimeter, an outer perimeter, and a plurality of fluid passageways extending between the inner perimeter and the outer perimeter, each fluid passageway having an inlet at the outer perimeter, an outlet at the inner perimeter, and defining a flow axis extending out of the the flow control element from the inner perimeter that is radially offset from the central axis;
    a plug having a cylindrical section and a tapered section extending from the cylindrical section and terminating at a distal end, the tapered section having a diameter that decreases from the cylindrical section to the distal end and including a helical groove formed therein, the plug being moveable along the central axis between a closed position, a low flow position, and a high flow position;
    in the closed position, the cylindrical section being disposed adjacent the inner perimeter of the flow control element to block fluid flow therethrough;
    in the low flow position and the high flow positions, the flow control element and the tapered section of the plug collectively define an annular vortex chamber, the volume of the annular vortex chamber increasing as the plug is moved from the low flow position to the high flow position;
    the fluid passageways in the stack of annular discs flow control element and the tapered section of the plug collectively imparting a rotational fluid flow around the central axis when the plug is in the low flow position and the high flow position, and as fluid exits the flow control element and flows through the vortex chamber toward the outlet.

13. The flow control device of claim 12, wherein each fluid passageway is a curved passageway.

14. The flow control device of claim 13, wherein the inlet of each fluid passageway is larger than the outlet of the corresponding fluid passageway.

15. The flow control device of claim 12, wherein each fluid passageway disc is a linear passageway.

16. The flow control device of claim 15, wherein the inlet of each fluid passageway is same size as the outlet.

17. The flow control device of claim 12, wherein the flow control element comprises a stack of annular discs, each disc having a plurality of the fluid passageways formed therein.

18. The flow control device of claim 17, wherein each disc includes four linear fluid passageways formed therein, the outlets of which are space 90 degrees from each other.

19. The flow control device of claim 17, wherein each disc includes three curved fluid passageways formed therein, the outlets of which are space 120 degrees from each other.

20. The flow control device of claim 12, wherein in a longitudinal cross section of the plug including the central axis, the tapered section includes opposed convex sides.

* * * * *